E. I. DODDS.
STAY BOLT CONSTRUCTION.
APPLICATION FILED JUNE 2, 1921.
1,417,150.
Patented May 23, 1922.
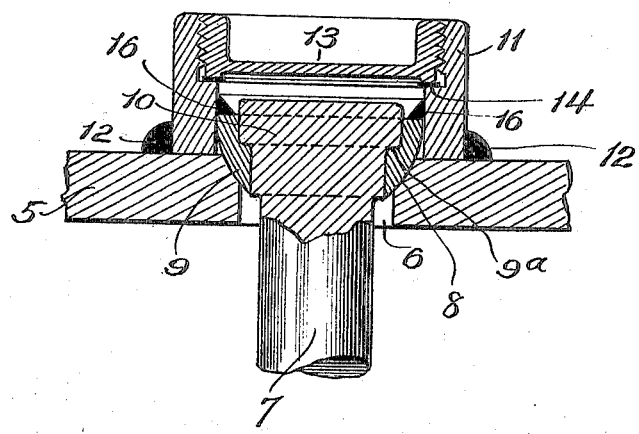
Inventor
E. I. Dodds
By Seymour & Bright
Attorneys.

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT CONSTRUCTION.

1,417,150.　　　　Specification of Letters Patent.　　Patented May 23, 1922.

Original application filed January 22, 1921, Serial No. 439,153. Divided and this application filed June 2, 1921. Serial No. 474,375.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Construction; and I do hereby declare the following to be a full, clear, and exact description of the invention, such as will enable others skilled in the art to which it appertains to make and use the same.

My invention relates to an improvement in staybolt construction and is a division of application Serial Number 439,153 filed by me January 22nd, 1921.

The object of the invention is to provide a bolt bearing member adapted for initial universal adjustment in the outer sheet of the boiler, and a bolt having a longitudinal movement in said bearing member, the latter being secured against movement after it has been initially adjusted so that its axis will be parallel with the long axis of the bolt, and it consists in the combination of parts as will be more fully described and pointed out in the claims.

The accompanying drawing is a view in section of my improvement.

5 represents the outer sheet of a boiler having an opening 6 for the passage of the staybolt 7. The outer portion of this opening is concaved as shown at 8 to form a curved seat for the bolt bearing member 9, the body of which latter is semi-spherical and rests within said curved seat 8, and is adapted to be initially adjusted therein so that its axis will be parallel with the long axis of the bolt.

The bolt bearing member 9 is provided with a cylindrical bore which is counterbored at its outer end to receive the cylindrical head 10 of the bolt 7, which head is seated on the shoulder 9ᵃ of the bearing member 9. The bolt is loosely mounted in the bearing member 9 and is free to move longitudinally therein, and as the bearing member is initially adjustable, it will be apparent that the bolt and its bearing may be adjusted to any inclination within the limits required and the bolt be free to move longitudinally within the bearing member and accommodate itself to the movements of the boiler sheets to which it may be connected.

The bearing member 9 and bolt head 10 are housed by the sleeve 11 welded as at 12 to the outer sheet 5, and this sleeve is internally threaded at its outer end to be engaged by the external threads on the cap 13, which when in place, rests on the annular flange 14 on the sleeve 11 sufficient space being left between the outer end of the head of the bolt 7 and the cap for the necessary or desirable longitudinal movement of the bolt.

After the sleeve and bearing member have been assembled and adjusted and the sleeve secured by welding as above explained, the bearing member is welded as at 16 to the inner face of the sleeve, thus preventing movement of the bearing member on its seat on the boiler sheet, but permitting free longitudinal movement of the bolt in the bearing member.

The cap 13 is removable for the ready inspection and replacement of the bolt.

It is evident that changes may be made in the details of the parts hence I would have it understood that I do not confine myself to the details as shown but consider myself at liberty to make such changes as may fall within the scope of the invention.

Having fully described my invention what I claim as new and desire to secure by Letters-Patent, is:—

1. In a staybolt structure, the combination of a boiler sheet having a bolt opening the wall of which is concave to form a seat for a bolt bearing member, a convex bolt bearing member mounted in said seat and provided with a seat for a bolt head, a bolt the head of which is supported by and mounted to move in said bearing member, a sleeve welded to the boiler sheet around the bolt opening and a cap closing the outer end of said sleeve, the said bolt bearing member being welded to the sleeve.

2. In a staybolt structure, the combination of a boiler sheet having a bolt opening the wall of which is concave, a convex bolt bearing member mounted in said concave seat and provided with a cylindrical bore, a bolt having a cylindrical head seated in the bore of the bearing member so that the bolt may move longitudinally therein, a sleeve welded to the boiler sheet around the bolt opening and a cap closing the outer end of the sleeve, the said bolt bearing member being welded to the sleeve.

In testimony whereof, I have signed this specification in the presence of a subscribing witness.

ETHAN I. DODDS.

Witness:
EDWIN S. RYCE.